(12) United States Patent
Sunaga et al.

(10) Patent No.: US 7,322,840 B2
(45) Date of Patent: Jan. 29, 2008

(54) PACKAGE WITH LOCKING MECHANISM AND OPTICAL TRANSCEIVER

(75) Inventors: Yoshinori Sunaga, Hitachinaka (JP); Yoshiaki Ishigami, Hitachi (JP); Izumi Fukasaku, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/193,343

(22) Filed: Aug. 1, 2005

(65) Prior Publication Data

US 2006/0068628 A1    Mar. 30, 2006

(30) Foreign Application Priority Data

Sep. 27, 2004    (JP) ............................. 2004-279138

(51) Int. Cl.
*H01R 13/62* (2006.01)

(52) U.S. Cl. .................................................. 439/160

(58) Field of Classification Search ................ 439/352, 439/353, 372, 160, 484; 385/88, 89, 92, 385/72, 53; 361/728, 732, 733
See application file for complete search history.

(56) References Cited

U.S. PATENT DOCUMENTS

| 5,980,324 | A | 11/1999 | Berg et al. |
| 6,371,787 | B1 | 4/2002 | Branch et al. |
| 6,439,918 | B1 * | 8/2002 | Togami et al. .............. 439/372 |
| 6,538,882 | B2 * | 3/2003 | Branch et al. .............. 361/687 |

* cited by examiner

*Primary Examiner*—Alexander Gilman
(74) *Attorney, Agent, or Firm*—McGinn IP Law Group, PLLC

(57) ABSTRACT

A package with a locking mechanism has: a package main body insertable into a cage formed in a host instrument; a package head integrated with the package main body; a latch member provided with the package main body, the latch member restricting detachment of the package main body from the cage when it is inserted into a hole formed in a wall of the cage and it is at a contact plane thereof in contact with a front edge of the hole while protruding from a predetermined face of the package main body; and a revolving shaft disposed perpendicular to a direction in which the package main body is inserted into and detached from the cage, the latch member being pivoted on the revolving shaft. The revolving shaft is disposed near the contact plane of the latch member.

23 Claims, 9 Drawing Sheets

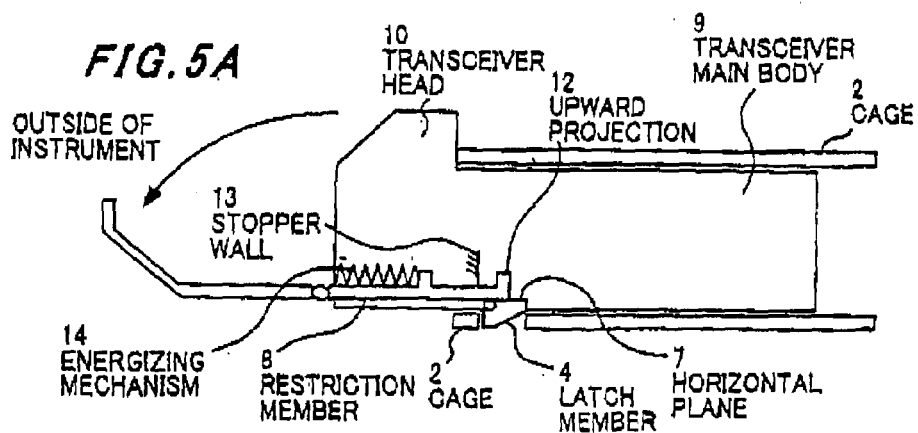
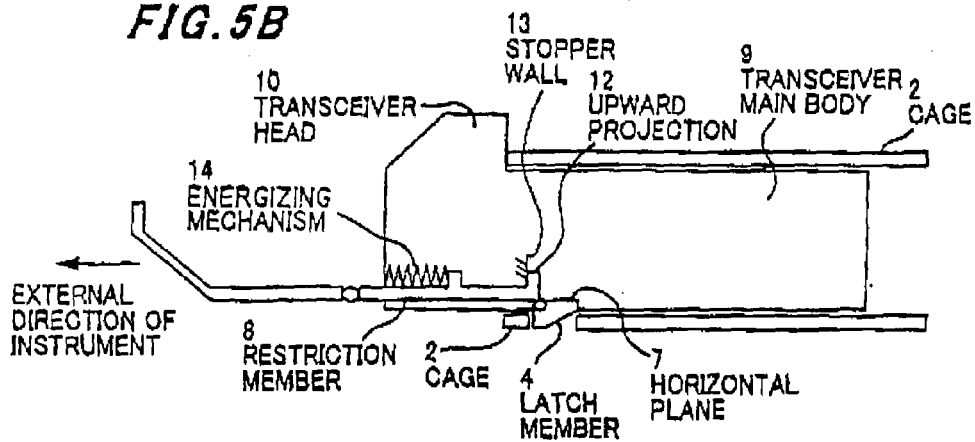
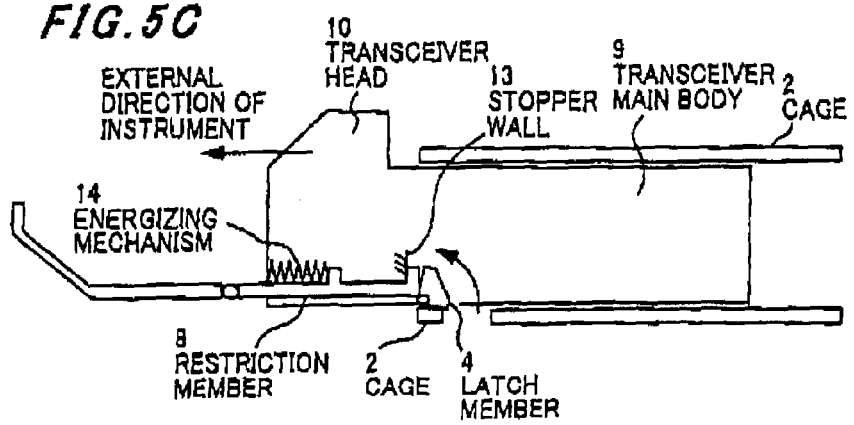

PACKAGE WITH LOCKING MECHANISM AND OPTICAL TRANSCEIVER

The present application is based on Japanese patent application No. 2004-279138, the entire contents of which are incorporated herein by reference.

BACKGROUND OF THE INVENTION

1. Field of the Invention

This invention relates to an optical package and an optical transceiver with a locking mechanism operable to be detachably placed in a host instrument and, more particularly to, an optical package and an optical transceiver with a locking mechanism that can be easily detached from the host instrument.

2. Description of the Related Art

In a host instrument, an optical transceiver which is actually served for optical communication (which means only mutual conversion of optical signals and electrical signals in a narrow sense, while it involves also protocol processing in a lower hierarchy in a broad sense) through connection of optical fiber is incorporated.

There are two types of optical transceiver, and one of them is a stationary type transceiver which is incorporated into a host instrument, and connected and secured to an inside base plate of a host instrument by means of solder and the like; and the other is a pluggable type transceiver which is applied in such that the transceiver is inserted into a window which has been previously provided on the host instrument. Such optical transceiver of a pluggable type can be replaced in response to some troubles or a variety of communication specifications.

The inside of a host instrument is provided with a container having an opening on either side thereof called by the name of "cage" for containing an optical transceiver of a pluggable type therein which is inserted through a window, and further connection terminals for electrical connection (receiving side) are disposed on the innermost part of the cage. The optical transceiver is arranged in such that optical devices and electronic circuits required for light transmission and reception are contained in a substantially rectangular parallelepiped transceiver main body, and an end of the transceiver main body is provided with connection terminals for electrical connection (side to be inserted). Thus, when the optical transceiver is inserted into the cage through the window, both the connection terminals are electrically connected with each other, whereby it becomes possible to transmit information between the host instrument and the optical transceiver.

A pluggable type optical transceiver is provided with a locking mechanism for preventing such a possibility that the optical transceiver detachable to the host instrument is fallen away from the host instrument due to unforeseen oscillations or impact shocks, or maintaining a positive condition of electrical connection between the optical transceiver and the host instrument. More specifically, the transceiver main body is provided with a member engaging with the cage being a part of the host instrument, the member moving to a direction perpendicular to a direction along which the optical transceiver is inserted into the cage in the case when the optical transceiver is in a position where a positive electrical connection is kept in the connection terminals. The member moves in the direction perpendicular to that along which the optical transceiver is inserted into the cage to engage therewith, and hence, the optical transceiver is locked. On the other hand, when the member moves up to a position where the member is disengaged with the cage, the optical transceiver may be extracted.

For an operation of shifting the member from a position where the member to be engaged with the cage to a position where the member to be disengaged with the cage, heretofore a latch member is disposed inside the optical transceiver. Since the latch member is positioned in the innermost place of the optical transceiver so as to engage with the cage, such a movable member is required for operating the latch member from the outside of the window in the host instrument. Namely, a part of the movable member reaches the latch member, while another part of which can be observed from the outside of the window in the host instrument.

In FIGS. 1A and 1B, an essential part of a locking mechanism disclosed in U.S. Pat. No. 6,439,918 is shown. The locking mechanism shown in FIG. 1A involves a latch member 74 which functions to restrict extraction of a transceiver main body (a movement towards the left side in the drawing) as a result of fitting the latch member into a port 73 formed on the undersurface of a cage 72 so as to protrude from the undersurface 71 (represented by the alternate long and short dash line) of the transceiver main body. The latch member 74 contains a vertical plane 75 which outgoes vertically from the undersurface of the transceiver main body. The latch member 74 is pivoted rotatably on a revolving shaft 76 extending perpendicularly to insertion and extraction directions along the undersurface of the transceiver main body at a position outside an instrument (in other words, the left side) from the vertical plane 75. As a matter of course, the transceiver main body maintains a space, which can contain the latch member 74, inside thereof without extending beyond the undersurface 71 of the transceiver main body in the case when the latch member 74 is rotated.

As shown in FIG. 1B, when the latch member 74 is rotated counterclockwise around the revolving shaft 76 to enter a space inside the transceiver main body, the vertical plane 75 does not abut upon the port 73, whereby a locking state of the latch member is released. Although it is not shown in the drawing, but omitted, a transceiver head which exposes outside the host instrument is integrated with the transceiver main body, and further, another movable member is disposed on the transceiver head for operating rotatably the latch member 74.

In FIGS. 2A and 2B, an essential part of a locking mechanism disclosed in U.S. Pat. No. 5,980,324 is shown.

The locking mechanism shown in FIG. 2A involves a fixed projection 84 which functions to restrict extraction of a transceiver main body (a movement towards the left side in the drawing) as a result of fitting the fixed projection into a hole 83 formed on the undersurface of a cage 82 so as to protrude from the undersurface 81 of the transceiver main body. The fixed projection 84 is in a fixed state with respect to the transceiver main body, and the fixed projection 84 contains a vertical plane 85 which outgoes vertically from the undersurface of the transceiver main body.

As shown in FIG. 2B, an area around the hole 83 in the undersurface of the cage 82 is made of a leaf spring 86 an end of which is a free end on the external side of an instrument for the transceiver main body. When the leaf spring 86 is directed downwards, the vertical plane 85 does not abut upon the hole 83, whereby a locking state of the fixed projection is released. Although it is not shown in the drawing, but omitted, a transceiver head which exposes outside the host instrument is integrated with the transceiver main body, and further, amovable member is disposed on the transceiver head for operating to direct the leaf spring 86 towards the downward direction.

In the locking mechanism shown in FIGS. 1A and 1B, the latch member 74 incorporated in the transceiver main body moves to disengage from the port 73 in the cage 72. On one hand, in the locking mechanism shown in FIGS. 2A and 2B, a part of the cage 82 rises to disengage the fixed projection 84, which is fixed to the transceiver main body, from the hole 83 in the cage 82.

In both the cases in common, however, the vertical planes 75 and 85 abut upon edges of the port 73 or the hole 83 in the cages 72 and 82, so that the vertical planes 75 and 85 go out from the port 73 or the hole 83 while keeping a friction with the edges of the port 73 or the hole 83, respectively. Since the port 73 or the hole 83 is fabricated by punching out the cage 72 or 82 made of a sheet metal, the resulting edge has a sharp surface. Under the circumstances, the vertical plane 75 or 85 scrapes against the edge of the port 73 or the hole 83, so that there is a case where the latch member 74 or the fixed projection 84 is damaged or worn away, resulting in an unreliable latch condition. Besides, when swarf produced by such scraping flies in all directions inside and outside the host instrument, it causes hindrance in optical connection or electrical troubles.

SUMMARY OF THE INVENTION

It is an object of the invention to provide an optical package and an optical transceiver with a locking mechanism that can be easily detached from a host instrument while preventing the damage or wear of components.

According to one aspect of the invention, a package with a locking mechanism comprises:

a package main body insertable into a cage formed in a host instrument;

a package head integrated with the package main body, the package head protruding from the host instrument when the package main body is inserted into the cage;

a latch member attached to the package main body, wherein the latch member restricts detachment of the package main body from the cage when it is inserted into a hole formed in a wall of the cage and it is at a contact plane thereof in contact with a front edge of the hole while protruding from a predetermined face of the package main body; and a revolving shaft disposed perpendicular to a direction in which the package main body is inserted into and detached from the cage, the latch member being pivoted on the revolving shaft, wherein the revolving shaft is disposed near the contact plane of the latch member.

According to another aspect of the invention, an optical transceiver comprises:

a transceiver main body insertable into a cage formed in a host instrument;

a transceiver head integrated with the package main body, the transceiver head protruding from the host instrument when the transceiver main body is inserted into the cage;

a latch member attached to the transceiver main body, wherein the latch member restricts detachment of the transceiver main body from the cage when it is inserted into a hole formed in a wall of the cage and it is at a contact plane thereof in contact with a front edge of the hole while protruding from a predetermined face of the transceiver main body; and a revolving shaft disposed perpendicular to a direction in which the transceiver main body is inserted into and detached from the cage, the latch member being pivoted on the revolving shaft, wherein the revolving shaft is disposed near the contact plane of the latch member.

(i) The predetermined face may comprise an undersurface, a top surface or a side surface of the package main body.

(ii) It is preferred that the revolving shaft is disposed near the contact plane of the latch member such that an imaginary straight line lying between the front edge of the hole and an axis of the revolving shaft has an angle of 45 degrees or less relative to a line perpendicular to the predetermined face of the package main body.

(iii) It is preferred that the package main body is provided with a latch member restricting member that restricts rotation of the latch member when it is in contact with the latch member, wherein the rotation of the latch member is allowed when latch member restricting member is moved toward an outside of the host instrument up to a position where it is not in contact with the latch member.

(iv) The latch member may be formed of a wedge shape.

(v) It is preferred that the package head is provided with a lever linked to an end of the latch member restricting member through a linking shaft, wherein the lever can be rotated toward the outside of the host instrument around the linking shaft to allow the rotation of the latch member.

(vi) It is preferred that the lever comprises a free end, the package head is provided with a fulcrum to rotatably support an other end of the lever, and the linking shaft is located between the free end and the other end of the lever.

(vii) It is preferred that the latch member restricting member is provided with a projection at an opposite end to an end where it is linked to the lever, wherein the package main body is provided with a stopper wall that stops the movement of the latch member restricting member toward the outside of the host instrument while being in contact with the projection, when the latch member restricting member is moved to the position where it is not in contact with the latch member.

(viii) It is preferred that the package main body is provided with an energizing mechanism that is compressed when the latch member restricting member is moved to the position where it is not in contact with the latch member, and that can push back the latch member restricting member to the position where the latch member restricting member is in contact with the latch member when the compression is released.

(ix) It is preferred that the package main body is provided with a slide groove that allows the movement of the latch member restricting member toward the outside of the host instrument while accommodating the latch member restricting member therein.

(x) It is preferred that the package main body is provided with a latch member restricting member that restricts rotation of the latch member while allowing the latch member to protrude from the package main body when it is in contact with a predetermined face of the latch member.

(xi) The predetermined face may comprise an undersurface, a top surface or a side surface of the latch member.

By the invention, the following excellent advantages are obtained:

(a) The locking mechanism of the invention can be easily detached, i.e. it can be detached with a smaller force.

(b) Since the latch member can be pulled out from the hole of the cage in point-contact with the front edge of the hole, the damage or wear of the latch member and the cage can be prevented.

BRIEF DESCRIPTION OF THE DRAWINGS

The present invention will be explained in more detail in conjunction with appended drawings, wherein:

FIGS. 1A and 1B are constitutional views each showing an essential part of a locking mechanism in an optical transceiver according to the prior art wherein FIG. 1A shows a locked state of the locking mechanism, while FIG. 1B shows an unlocked state of the locking mechanism;

FIGS. 2A and 2B are constitutional views each showing an essential part of another locking mechanism in an optical transceiver according to the prior art wherein FIG. 2A shows a locked state of the locking mechanism, while FIG. 1B shows an unlocked state of the locking mechanism;

FIGS. 3A, 3B, and 3C are constitutional views each showing an essential part of a locking mechanism in an optical transceiver according to an embodiment of the present invention wherein FIG. 3A shows a locked state of the locking mechanism, while FIG. 3B shows an unlocked state of the locking mechanism; and FIG. 3C shows a modification of the arrangement of the locking mechanism in which a revolving shaft 6 is disposed slightly from a vertical place 5 toward an external direction of the instrument;

FIGS. 5A, 5B, and 5C are views each showing a different situation of the correlation parts of the locking mechanism shown in FIG. 4;

DESCRIPTION OF THE PREFERRED EMBODIMENTS

In the following, a preferred embodiment according to the present invention will be described in conjunction with the accompanying drawings.

Figure 3A:
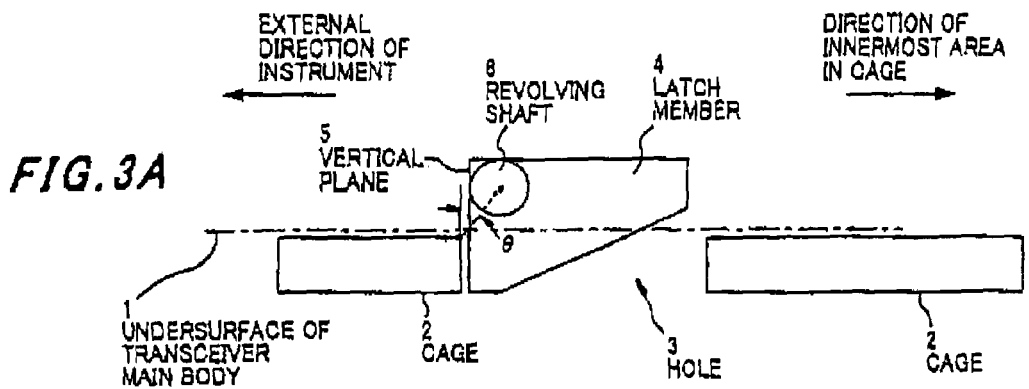
Figure 3B:
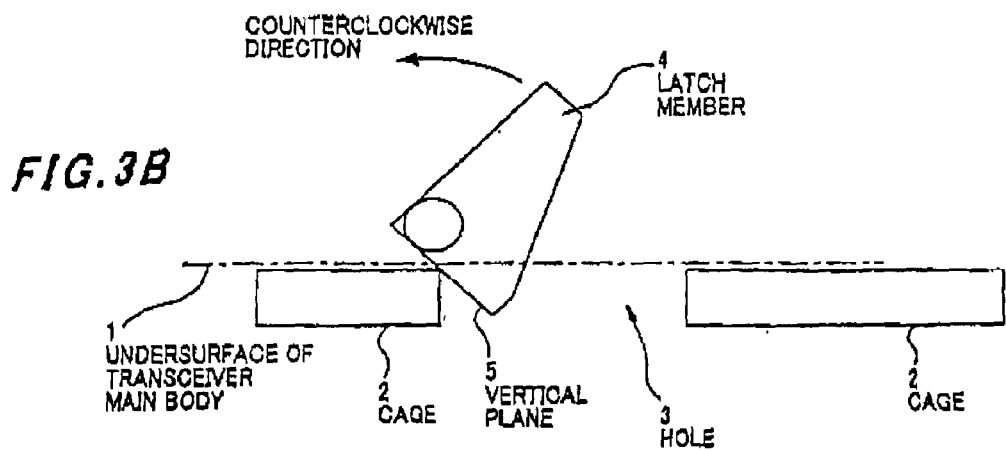

Each of FIGS. 3A and 3B shows an essential part of a locking mechanism in the case where a package with a locking mechanism according to the present invention is applied to an optical transceiver wherein the locking mechanism shown in FIG. 3A is provided with a latch member 4 for restricting extraction of a transceiver main body (a movement towards the left side in the drawing) as a result of fitting the latch member into a hole 3 formed on the undersurface of a cage 2 so as to protrude from the undersurface 1 (represented by the alternate long and short dash line) of the transceiver main body corresponding to a face of a package main body. The latch member 4 contains a vertical plane 5 which goes out vertically from the undersurface of the transceiver main body. The latch member 4 is pivoted rotatably on a revolving shaft 6 extending perpendicularly to insertion and extraction directions along the undersurface of the transceiver main body at a position located on the side towards the innermost area of the cage (in other words, the right side) from the vertical plane 5. As a matter of course, the transceiver main body maintains a space (not shown), which can contain the latch member 4, inside thereof without protruding the latch member 4 beyond the undersurface 1 of the transceiver main body in the case when the vertical plane 5 in the latch member 4 is rotated.

As shown in FIG. 3B, when the latch member 4 which is held by a transceiver main body 9 as explained later through the revolving shaft 6 is moved, together with the transceiver main boy 9, towards an external direction of an instrument from the cage 2, an edge of the hole 3 pushes the vertical plane 5, whereby the latch member 4 rotates counterclockwise around the revolving shaft 6. As a result, when the whole latch member 4 including the vertical plane 5 enters the space inside the transceiver main body, the vertical plane 5 comes to be not in plane-contact with the edge of the hole 3 of the cage 2 to be unlocked.

Figure 1A:
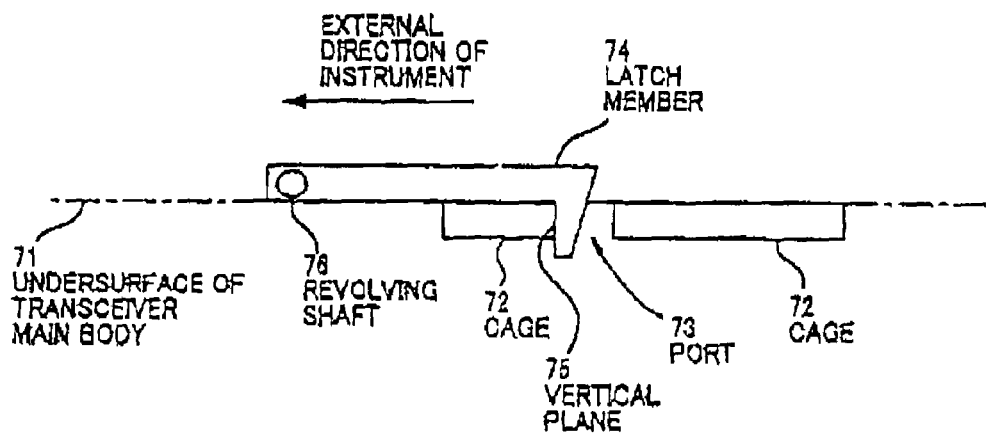
Figure 1B:
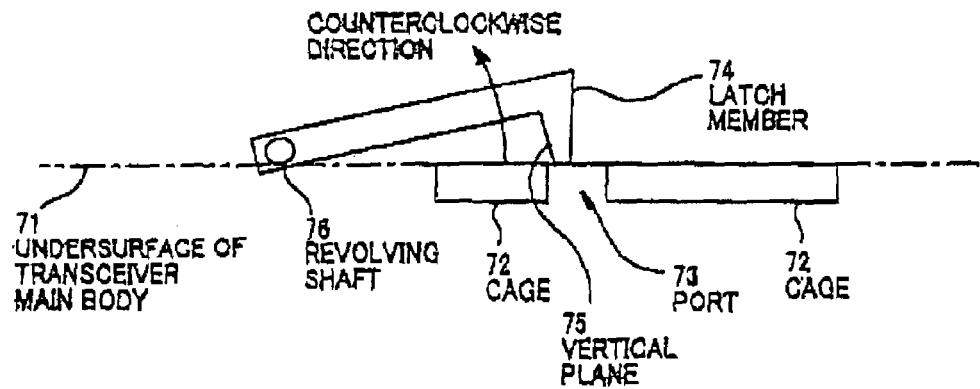

When the locking mechanism according to the present invention is compared with that of FIGS. 1A and 1B, the revolving shaft 76 is located far from the vertical plane 75 as shown in FIGS. 1A and 1B, while the revolving shaft 6 is located near the vertical plane 5 as shown in FIGS. 3A and 3B.

In these circumstances, when the latch member 74 rotates counterclockwise around the revolving shaft 76 as shown in FIGS. 1A and 1B, the vertical plane 75 is rubbed against the edge of the port 73 since it is in plane-contact therewith. In contrast, when the latch member 4 rotates counterclockwise around the revolving shaft 6 as shown in FIGS. 3A and 3B, the vertical plane 5 is not in plane-contact with the edge of the hole 3, so that the vertical plane 5 can smoothly slide on the edge corner of the hole 3. Thus, the damage or wear of the latch member 4 or cage 2 can be prevented, whereby the above-mentioned problems are solved.

In this embodiment, an angle θ defined by an imaginary straight line lying between a front edge (i.e., as shown in FIG. 3A, a top corner of the cage 2 where the revolving shaft 6 is closest to the bottom of the cage 2) of the hole 3 in the cage 2 being in contact with the vertical plane 5 and a center axis of the revolving shaft 6 relative to a line perpendicular to the undersurface 1 of the transceiver main body is desirably 45 degrees or less. When the angle θ exceeds 45 degrees, the revolving shaft 6 is located away from the vertical plane 5. As a result, the vertical plane 5 may be rubbed against the edge of the hole 3 in the cage 2 and the latch member 4 may finally fail to rotate counterclockwise around the revolving shaft 6. This is because the revolving shaft 6 is thus far from the vertical plain 5 and, thereby, the rotation radius of the revolving shaft 6 around the edge corner of hole 3 is increased. Thus, since the revolving shaft 6 is held by the transceiver main body 9 with a certain upper limit, the latch member 4 will fail to rotate around the revolving shaft 6 by being blocked by the edge of the hole 3.

Figure 3C:
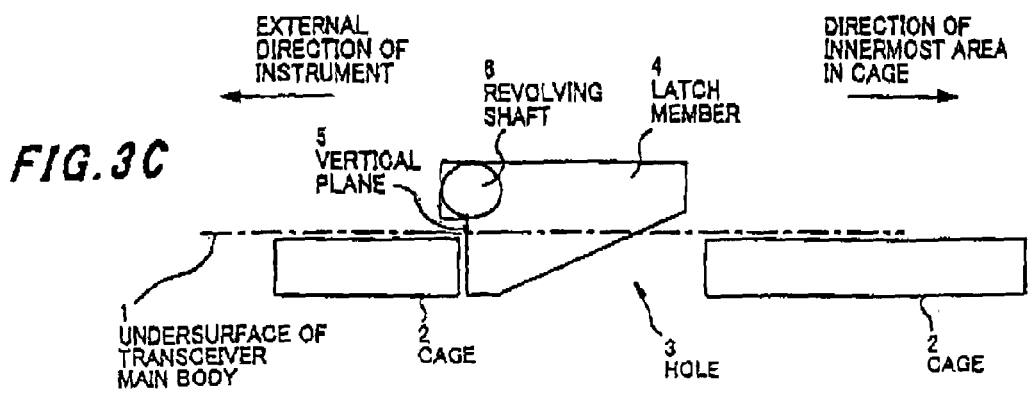

In modification, as shown in FIG. 3C, the revolving shaft 6 may be disposed shifted slightly from the vertical plane 5 toward the external direction of the instrument. Even in this case, the latch member 4 can rotate until when the transceiver main body 9 is detached from the cage 2.

Although in this embodiment the vertical plane 5 of the latch member 4 is formed to extend vertically from the undersurface of the transceiver main body, the outer face of the latch member 4 may be formed inclined or curved since the latch member 4 only has to be engaged with the edge of the hole 3 of the cage 2.

In the following, the embodiment will be described in conjunction with the other parts of an optical transceiver according to the present invention.

Figure 4:
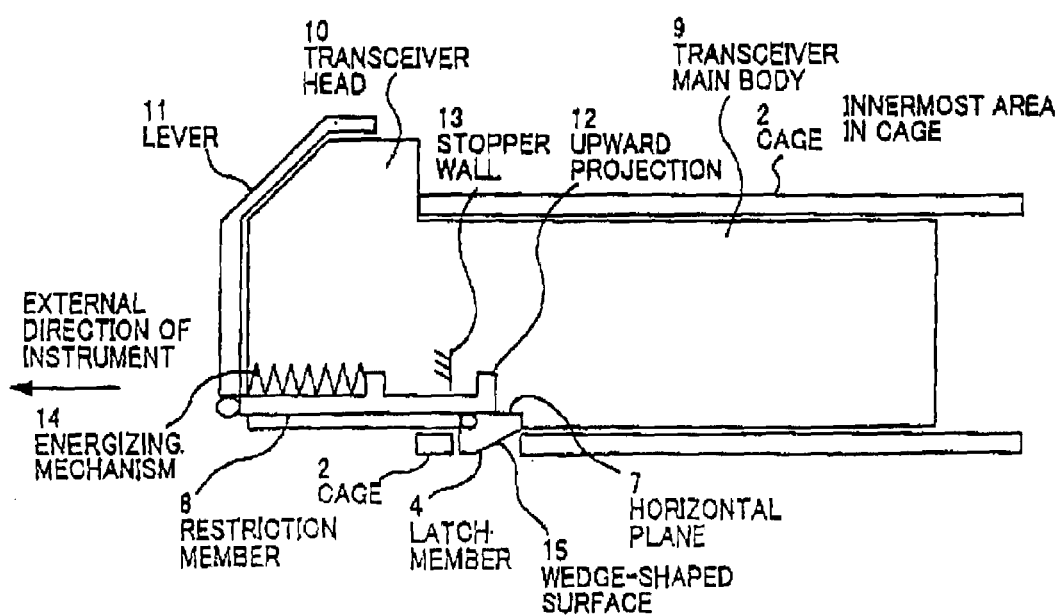
FIG. 4 is a constitutional view showing correlation parts of the locking mechanism in the optical transceiver according to the embodiment of the present invention.

As shown in FIG. 4, the latch member 4 has a horizontal plane 7 perpendicular to the vertical plane 5. A member 8 for restricting the latch member (hereinafter referred optionally to as "restriction member") is disposed so as to be in contact with the horizontal plane 7 and to restrict a rotation of the latch member 4. The restriction member 8 is arranged movable up to a position where it is disengaged with the horizontal plane 7 in the external direction of the instrument. The position where the restriction member 8 is disengaged with the horizontal plane 7 will be described more specifically hereunder with reference to FIG. 5C. The opposite side of the horizontal plane 7 is shaped into a wedge-shaped surface 15, but not a plane parallel to the horizontal plane 7. The wedge-shaped surface 15 has an acute interior angle with the vertical plane 5. Accordingly, the latch member 4 has a wedge shape sharpened in the direction of the innermost area of the cage 2.

The transceiver main body 9 to be inserted in the cage 2 is integrated with a transceiver head 10 corresponding to a package head exposed outside the host instrument. A lever 11 is provided by linking to an end of the restriction member 8 so as to be placed along the transceiver head 10. The horizontal plane of the transceiver head 10 is cut away so as to have an inclined surface. The lever 11 is bent in a gradual V-shape along the inclined surface of the transceiver head 10, and it extends further so as to bend in a small V-shape along the top horizontal plane of the transceiver head 10. The lever 11 is constituted inclinably outside the instrument by rotating around a shaft corresponding to a portion at which the lever 11 is linked to the restriction member 8.

The restriction member 8 is provided with an upward projection 12 at an end opposite to that linked to the lever 11. Inside the transceiver main body 9, a stopper wall 13 is disposed. The stopper wall 13 functions to stop a movement of the restriction member 8 by blocking a further movement of the upward projection 12 when the restriction member 8 is moved up to a position where the restriction member 8 comes away from the horizontal plane 7 of the latch member 4.

Inside the transceiver head 10, an energizing mechanism 14 is disposed. The energizing mechanism 14 functions to be compressed when the restriction member 8 is moved up to a position where the restriction member 8 comes away from the horizontal plane 7 of the latch member 4, while the energizing mechanism 14 functions to push back the restriction member 8 up to a position where the restriction member 8 rests on the horizontal plane 7 of the latch member 4 when the compression force is released.

Although it is not shown in the accompanying drawings, a receptacle into which an optical connector is to be inserted is formed in a space extending from the transceiver head 10 to the transceiver main body 9. In the transceiver main body 9, a light reception module and a light emission module faced to the receptacle, an electronic circuit for conducting optical transmission and reception by the use of these light emission and reception modules, another electronic circuit for conducting communication with a host instrument, and terminals to be connected with terminals in the cage 2 for such communication are incorporated.

Since it is desirable that the latch member 4 has a high strength, the latch member 4 may be made of zinc die casting or aluminum die casting. In the case where a higher strength is desired, it is suitable to use a metal injection molding (stainless steel). On one hand, the lever 11 may be fabricated by bending a wire (stainless steel) or may be made from zinc die casting, aluminum die casting, a plastic (resin) molding and the like. In any member, a material may be selected with taking a balance between cost and strength in a material to be used into consideration.

Locking and unlocking operations in the optical transceiver shown in FIG. 4 will be described by referring to FIGS. 5A, 5B, and 5C.

First, since the restriction member 8 rests on the horizontal plane 7 of the latch member 4 in a condition shown in FIG. 4, a rotation of the latch member 4 in the counterclockwise direction is restricted. Moreover, the latch member 4 fits into the hole 3 formed on the undersurface of the cage 2, so that the vertical plane 5 of the latch member 4 abuts upon the edge of the hole 3, whereby extraction of the transceiver main body 9 is restricted.

From the condition as described above, the lever 11 is inclined towards a direction outside the instrument up to a position where a part of the lever 11, extending from the shaft at the position where the lever 11 is linked to the restriction member 8, aligns with the restriction member 8 as shown in FIG. 5A. Then, the lever 11 is pulled in a direction outside the instrument as shown in FIG. 5B. As a result of extracting the lever 11, the restriction member 8 is also moved in the direction outside the instrument. In this occasion, the energizing mechanism 14 is compressed.

As shown in FIG. 5C, the stopper wall 13 blocks a further movement of the upward projection 12 to stop a movement of the restriction member 8, when the restriction member 8 is moved up to a position where the restriction member 8 comes away from the horizontal plane 7 of the latch member 4. It is to be noted that "the movement of the restriction member 8" mentioned herein means a relative movement of the restriction member 8 with respect to the transceiver main body 9. In reality, when the lever 11 is continued to extract, the upward projection 12 pushes the stopper wall 13, whereby a force acts upon the transceiver main body 9 so as to move it in the direction outside the instrument. On the other hand, since there is no object holding down the horizontal plane 7 in these circumstances, a rotation of the latch member 4 in the counterclockwise direction is free. Accordingly, when it is intended to shift the transceiver main body 9 towards the direction outside the instrument, the vertical plane 5 is pushed by the edge of the hole 3 formed on the undersurface of the cage 2, whereby the latch member 4 is rotated counterclockwise. The vertical plane 5 thus rotated is contained in the transceiver main body 9 without protruding the vertical plane 5 from the undersurface of the transceiver main body 9.

Figure 2A:
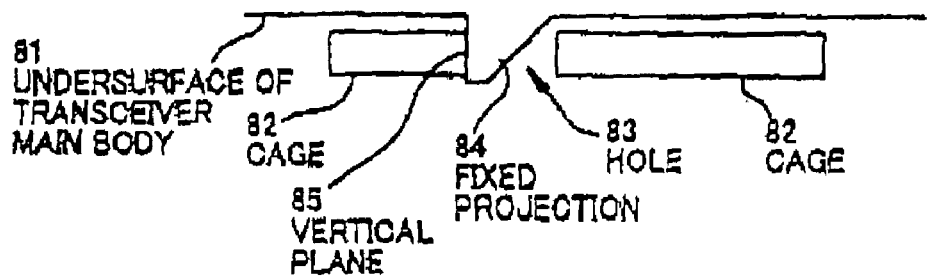

As mentioned above, a latch member or leaf spring is inevitably required for operating to shift the latch member 74 (FIGS. 1A and 1B) or the leaf spring 86 (FIGS. 2A. and 2B) in the prior art, while it is sufficient in the present invention that when the restriction member 8 for restricting the latch member 4 is disengaged with the latch member 4, the latch member 4 rotates naturally by merely extracting an optical transceiver.

When the lever 11 or the optical transceiver is further extracted from the condition shown in FIG. 5C, there is no object preventing a movement of the optical transceiver, so that the optical transceiver is extracted from the instrument. Thereafter, when let the lever 11 goes, the restriction member 8 returns to its original position due to a restoring force of the energizing mechanism 14.

Figure 2B:
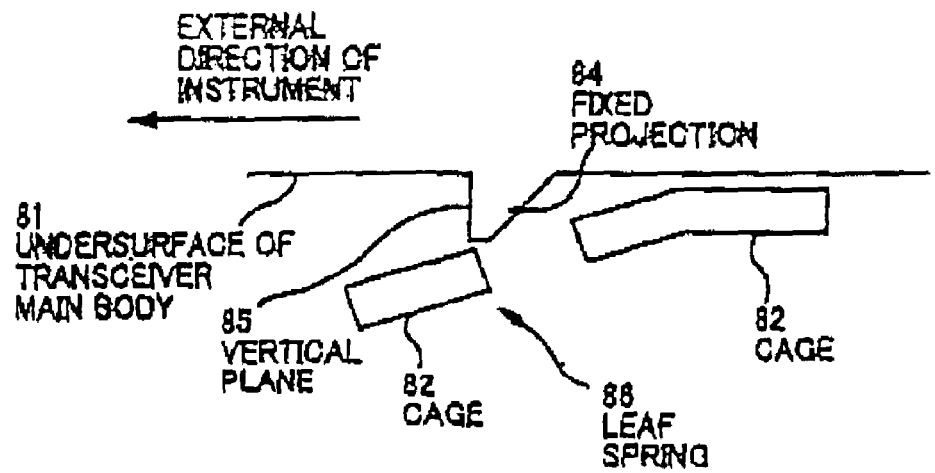
Figure 9:
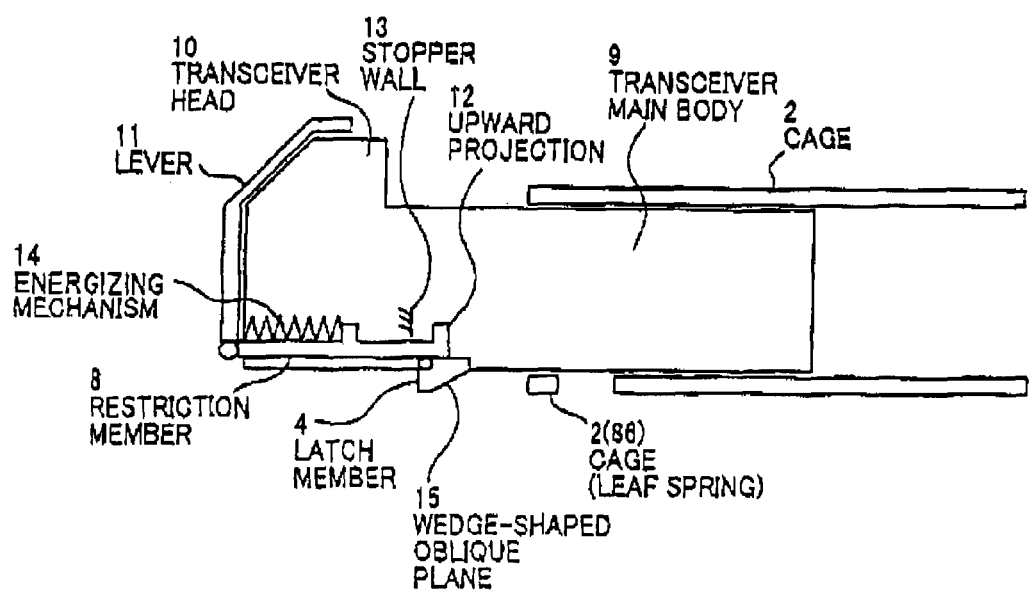
FIG. 9 is a view showing a different situation of the correlation parts of the locking mechanism of FIG. 4.

On the contrary, when an optical transceiver is intended to insert into the cage 2, its transceiver main body 9 is going to insert in the cage 2 from such a condition that the optical transceiver is present outside the cage 2 as shown in FIG. 9, in other words, a situation where the restriction member 8 rests on the latch member 4 as a result of restoration of the energizing mechanism 14. In these circumstances, since the latch member 4 has a wedge-shaped oblique plane 15, the latch member 4 advances in such a manner that it stretches out the leaf spring 86 described in FIG. 2B existing at an entrance of the cage 2. Then, when the latch member 4 fits in the hole 3, the leaf spring returns to its original state to be in a condition shown in FIG. 4.

As described above, the horizontal plane 7 perpendicular to the vertical plane 5 is formed on the latch member 4, and the restriction member 8 for restricting a rotation of the latch member 4 is disposed in contact with the horizontal member 7 in such a manner that the restriction member 8 is movable towards the outside of an instrument up to a position where it is disengaged with the horizontal plane 7, so that it is possible to operate locking and unlocking of the restriction member 8 with the cage 2 in accordance with a movement of the restriction member 8.

Furthermore, the lever 11 is provided on a shaft corresponding to a portion at which the lever 11 is linked to an end of the restriction member 8 so as to be placed along the transceiver head 10, and the lever 11 is further constituted inclinably outside the instrument by rotating around the shaft. Thus, the lever 11 is folded up usually so as not to form an obstacle, and the lever 11 may allow stretching inclinably to easily operate a movement of the restriction member 8 in only the case of need.

Moreover, the restriction member 8 is provided with the upward projection 12 at an end opposite to that linked to the lever 11. Inside the transceiver main body 9, the stopper wall 13 is disposed. The stopper wall 13 functions to stop a movement of the restriction member 8 by blocking a further movement of the upward projection 12 when the restriction member 8 is moved up to a position where the restriction member 8 comes away from the horizontal plane 7 of the latch member 4.

Accordingly, an extraction of an optical transceiver can be followed to an antilocking operation of the lever 11 by pulling it.

Inside the transceiver head 10, an energizing mechanism 14 is disposed. The energizing mechanism 14 functions to be compressed when the restriction member 8 is moved up to a position where the restriction member 8 comes away from the horizontal plane 7 of the latch member 4, while the energizing mechanism 14 functions to push back the restriction member 8 up to a position where the restriction member 8 rests on the horizontal plane 7 of the latch member 4, when the compression force is released by letting the lever 11 go.

In the following, a modification of the lever will be described.

Figure 6:
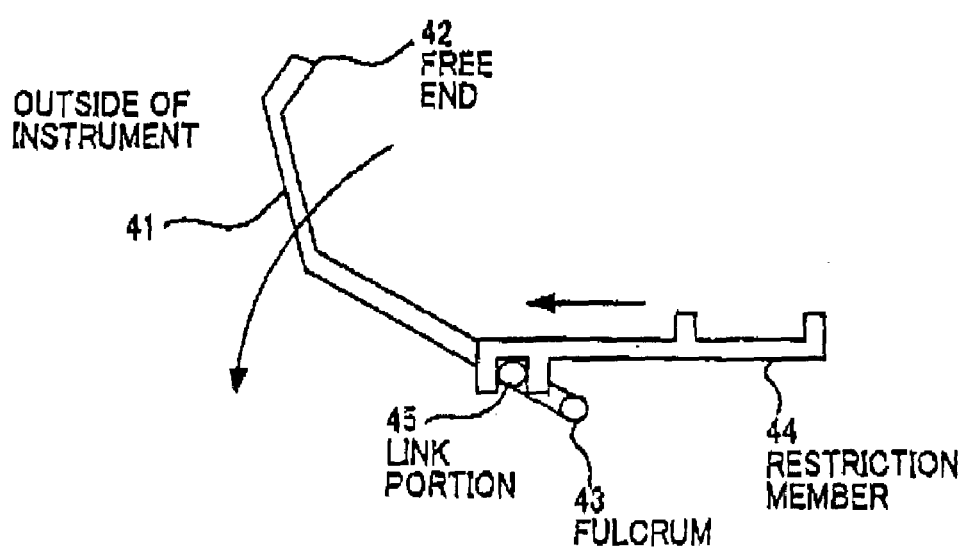
FIG. 6 is a view showing a lever and a member for restricting a latch member being a modification of the correlation parts of the locking member shown in FIG. 4.

As shown in FIG. 6, a lever 41 has the same constitution as that of the lever 11 of FIG. 4, i.e. a horizontal plane of a transceiver head 10 is cut away so as to have an inclined surface. The lever 41 is bent in a gradual V-shape along the inclined surface of the transceiver head 10, and it extends further so as to bend in a small V-shape along the top horizontal plane of the transceiver head 10. The constitution of the lever 41 is the same as that of the lever 11 in a point where an end of the lever 41 positioned at the top of the transceiver head 10 is a free end 42. However, a fulcrum 43 at which the lever 41 is rotatably supported is disposed at the lower portion of the transceiver head 10, and further a link portion 45 at which the lever 41 is linked to an end of a member 44 for restricting a latch member (hereinafter referred simply to as "restriction member") is arranged between the free end 42 and the fulcrum 43.

In this arrangement, when the lever 41 is going to incline in the direction outside an instrument, the restriction member 44 moves also towards the external direction of the instrument, and the other behaviors are the same as those of the above-mentioned embodiment.

Next, a built-up structure of an optical transceiver according to the present invention will be described.

Figure 7:
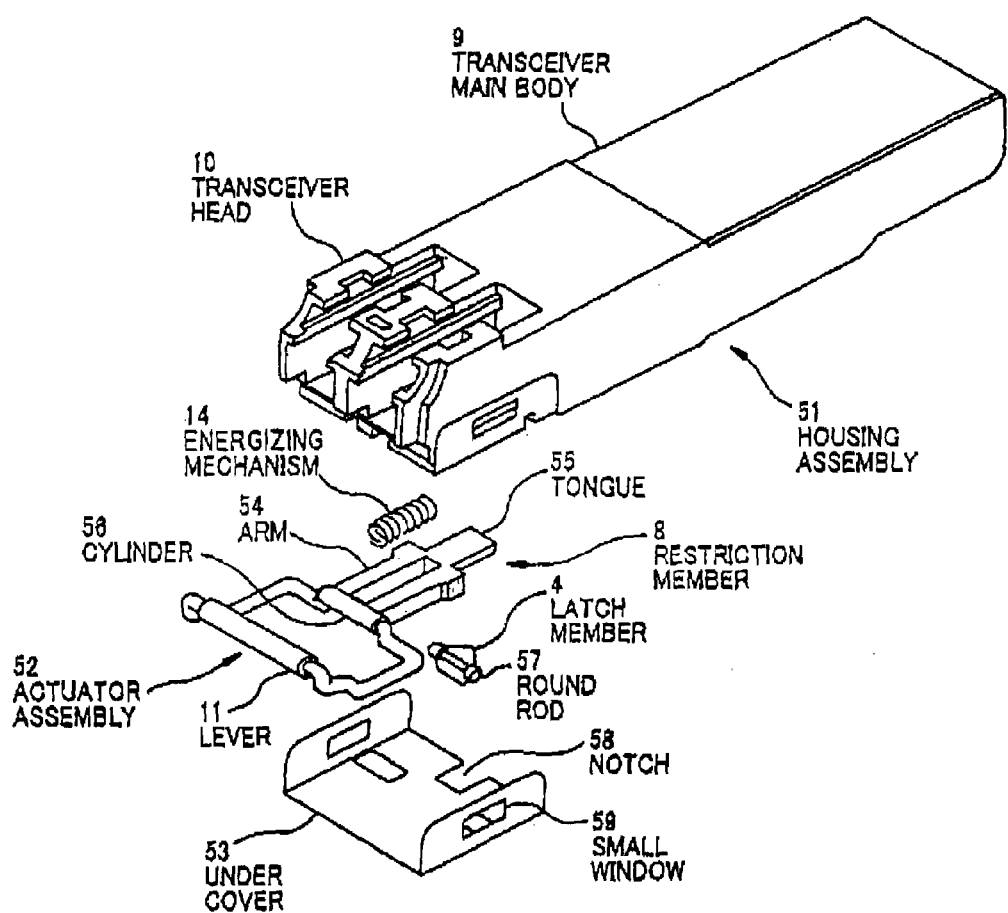
FIG. 7 is an exploded perspective view showing an optical transceiver according to an embodiment of the present invention.

As shown in FIG. 7, the optical transceiver may be divided into a housing assembly 51 composed of a transceiver head 10 and a transceiver main body 9; an actuator assembly 52 composed by incorporating an energizing mechanism 14, a latch member 4, a restriction member 8, and a lever into one component; and an under cover 53. The restriction member 8 is obtained by incorporating two arms 54 placed in parallel so as to have a gap within which the energizing mechanism 14 is arranged and a tongue 55 which holds down a horizontal plane 7 of the latch member 4 into one component. A cylinder 56, which functions as a rotary bearing, is held between each end of the two arms 54. The lever 11 is configured into a U-shape with a flat bottom so as not to form an obstacle, but keep a space for a central portion of the transceiver head 10 being a receptacle of an optical connector. Both ends of the lever 11 are further bent inwardly to be linked to a round rod functioning as a revolving shaft, and the round rod is inserted into the cylinder.

The latch member 4 is a three-dimensional member having the vertical plane 5 and the horizontal plane 7 explained in FIGS. 3A and 3B, and a round rod 57 served for a revolving shaft is integrally formed with the latch member 4 at a corner defined by the vertical plane 5 and the horizontal plane 7. The under cover 53 is a plate material composed by integrating a bottom plate for covering the undersurface of the transceiver head 10 on the side where it is contained in the housing assembly 51 with side plates each of which is folded sideward. A notch 58 served as a port for entering and leaving the latch member 4 is formed on the bottom of the under cover 53, while a small window 59 for locking a snap part which will be mentioned later is formed on each of the side plates.

Figure 8:
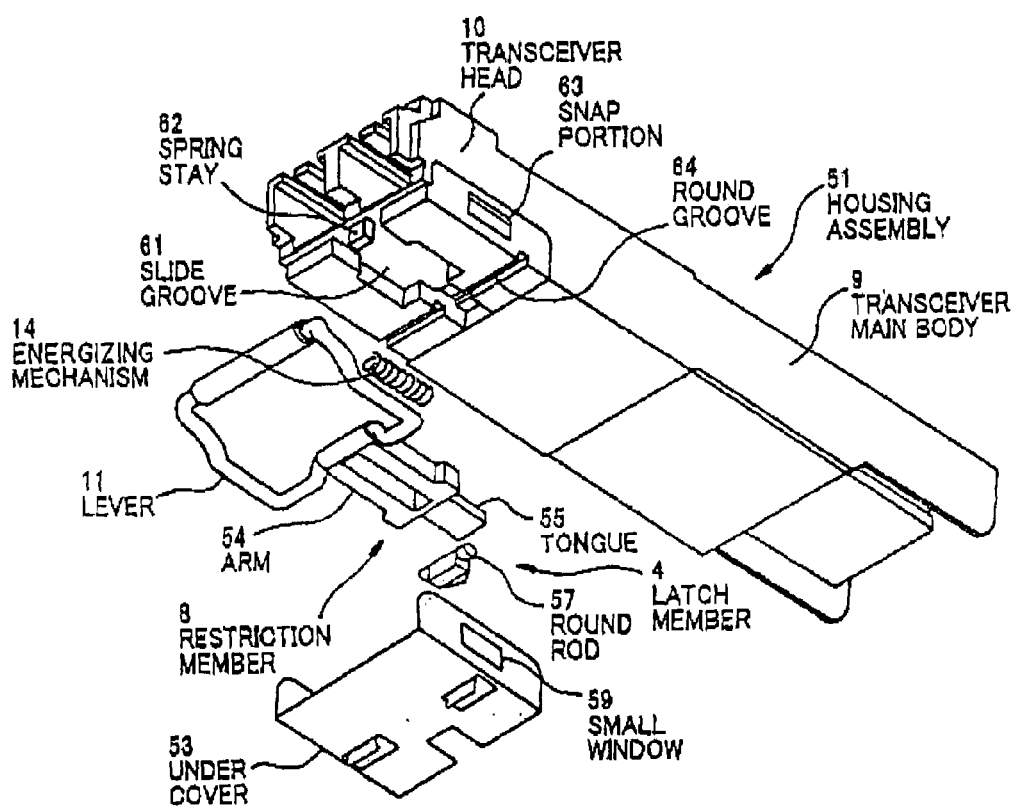
FIG. 8 is an exploded perspective view showing the optical transceiver of FIG. 7 viewed from a different angle.

As shown in FIG. 8, a slide groove 61, which is opened in the undersurface of the transceiver head 10 and contains movably the restriction member 8, is formed on the side of the transceiver head 10 in the housing assembly 51. The slide groove 61 functions to restrict breadthewise a movement of the arms 54 and 54, and to limit movable directions of the restriction member 8 to only inserting and extracting directions. The slide groove 61 extends along the undersurface of the transceiver main body 9 to communicate with a space wherein the latch member 4 is contained rotatably. Inside the slide groove 61, a spring stay 62 for receiving an end of the energizing mechanism 14 is formed. On one hand, the other end of the energizing mechanism 14 abuts upon the tongue 55 located between the two arms 54 and 54. Snap portions 63 and 63 are formed on the side surfaces of the transceiver head 10 so as to protrude from the side surfaces thereof. On the undersurface of the transceiver head 10, a round groove 64 for fitting the round rod 57, which is a revolving shaft of the latch member 4, thereinto, is defined.

Into the slide groove 61 of the housing assembly 51 shown in FIG. 8, the actuator assembly 52, the energizing mechanism 14, and latch member 4 are contained, and then, the under cover 53 is attached to the housing assembly 51 so as to cover an opening of the slide groove 61. When the snap portions 63 and 63 are fitted into the small windows 59 and 59, the under cover 53 is fixed, whereby the respective parts are held in the slide groove 61.

It will be appreciated by those of ordinary skill in the art that the present invention can be embodied in other specific forms without departing from the spirit or essential characteristics thereof.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A package with a locking mechanism, comprising:
   a package main body insertable into a cage formed in a host instrument;
   a package head integrated with the package main body, the package head protruding from the host instrument when the package main body is inserted into the cage;
   a latch member attached to the package main body, wherein the latch member restricts detachment of the package main body from the cage when the latch member is inserted into a hole formed in a wall of the cage and the latch member is at a contact plane thereof in contact with a front edge of the hole while protruding from a predetermined face of the package main body; and
   a revolving shaft disposed perpendicular to a direction in which the package main body is inserted into and detached from the cage, the latch member being pivoted on the revolving shaft,
   wherein the revolving shaft is disposed near the contact plane of the latch member and at least a portion of the revolving shaft is located above the hole while the latch member fits in the hole.

2. The package with a locking mechanism as defined in claim 1, wherein:
   the predetermined face comprises an undersurface of the package main body.

3. The package with a locking mechanism as defined in claim 1, wherein:
   the latch member is rotatable with being pulled out, or while being pulled out, from the hole of the cage in contact with the front edge of the hole.

4. The package with a locking mechanism as defined in claim 1, wherein:
   the package main body is provided with a latch member restricting member that restricts rotation of the latch member while allowing the latch member to protrude from the package main body when the latch member restricting member is in contact with a predetermined face of the latch member.

5. The package with a locking mechanism as defined in claim 4, wherein:
   the predetermined face comprises an undersurface, a top surface or a side surface of the latch member.

6. The package with a locking mechanism as defined in claim 1, wherein:
   the revolving shaft is disposed near the contact plane of the latch member such that an imaginary straight line lying between the front edge of the hole and a center axis of the revolving shaft has an angle of 45 degrees or less relative to a line perpendicular to the predetermined face of the package main body.

7. The package with a locking mechanism as defined in claim 6, wherein:
   the predetermined face comprises an undersurface of the package main body.

8. The package with a locking mechanism as defined in claim 6, wherein:
   the predetermined face comprises a top surface or a side surface of the package main body.

9. The package with a locking mechanism as defined in claim 1, wherein:
   the package main body is provided with a latch member restricting member that restricts rotation of the latch member when said latch member restricting member is in contact with the latch member,
   wherein the latch member is allowed to be rotated when the latch member restricting member is moved toward an outside of the host instrument up to a position where said latch member restricting member is not in contact with the latch member.

10. The package with a locking mechanism as defined in claim 9, wherein:
    the latch member is formed of a wedge shape.

11. The package with a locking mechanism as defined in claim 9, wherein:
    the package main body is provided with an energizing mechanism that is compressed when the latch member restricting member is moved to the position where the latch member restricting member is not in contact with the latch member, and that can push back the latch member restricting member to the position where the latch member restricting member is in contact with the latch member when the compression is released.

12. The package with a locking mechanism as defined in claim 9, wherein:
    the package main body is provided with a slide groove that allows the movement of the latch member restricting member toward the outside of the host instrument while accommodating the latch member restricting member therein.

13. The package with a locking mechanism as defined in claim 1, wherein:
    the predetermined face comprises a top surface or a side surface of the package main body.

14. The package with a locking mechanism as defined in claim 9, wherein:
    the package head is provided with a lever linked to an end of the latch member restricting member through a linking shaft, wherein the lever can be rotated toward the outside of the host instrument around the linking shaft to allow the rotation of the latch member.

15. The package with a locking mechanism as defined in claim 14, wherein:
    the lever comprises a free end, the package head is provided with a fulcrum to rotatably support an other end of the lever, and
    the linking shaft is located between the free end and the other end of the lever.

16. The package with a locking mechanism as defined in claim 14, wherein:
    the latch member restricting member is provided with a projection at an opposite end to an end where the latch member restricting member is linked to the lever,
    wherein the package main body is provided with a stopper wall that stops the movement of the latch member restricting member toward the outside of the host instrument while being in contact with the projection, when the latch member restricting member is moved to the position where the latch member restricting member is not in contact with the latch member.

17. An optical transceiver, comprising:
a transceiver main body insertable into a cage formed in a host instrument;
a transceiver head integrated with the package main body, the transceiver head protruding from the host instrument when the transceiver main body is inserted into the cage;
a latch member attached to the transceiver main body, wherein the latch member restricts detachment of the transceiver main body from the cage when the latch member is inserted into a hole formed in a wall of the cage and the latch member is at a contact plane thereof in contact with a front edge of the hole while protruding from a predetermined face of the transceiver main body; and
a revolving shaft disposed perpendicular to a direction in which the transceiver main body is inserted into and detached from the cage, the latch member being pivoted on the revolving shaft,
wherein the revolving shaft is disposed near the contact plane of the latch member and at least a portion of the revolving shaft is located above the hole while the latch member fits in the hole.

18. The optical transceiver as defined in claim 17, wherein:
the predetermined face comprises an undersurface, a top surface or a side surface of the package main body.

19. The optical transceiver as defined in claim 17, wherein:
the latch member is rotatable with being pulled out, or while being pulled out, from the hole of the cage in contact with the front edge of the hole.

20. A package with a locking mechanism, comprising:
a package main body insertable into a cage formed in a host instrument;
a package head integrated with the package main body, the package head protruding from the host instrument when the package main body is inserted into the cage;
a latch member attached to the package main body, wherein the latch member restricts detachment of the package main body from the cage when the latch member is inserted into a hole formed in a wall of the cage and the latch member is at a contact plane thereof in contact with a front edge of the hole while protruding from a predetermined face of the package main body; and
a revolving shaft disposed perpendicular to a direction in which the package main body is inserted into and detached from the cage, the latch member being pivoted on the revolving shaft,
wherein the revolving shaft is disposed near the contact plane of the latch member such that an imaginary straight line lying between the front edge of the hole and a center axis of the revolving shaft has an angle of 45 degrees or less relative to a line perpendicular to the predetermined face of the package main body,
wherein the predetermined face comprises an undersurface of the package main body.

21. A package with a locking mechanism, comprising:
a package main body insertable into a cage formed in a host instrument;
a package head integrated with the package main body, the package head protruding from the host instrument when the package main body is inserted into the cage;
a latch member attached to the package main body, wherein the latch member restricts detachment of the package main body from the cage when the latch member is inserted into a hole formed in a wall of the cage and the latch member is at a contact plane thereof in contact with a front edge of the hole while protruding from a predetermined face of the package main body; and
a revolving shaft disposed perpendicular to a direction in which the package main body is inserted into and detached from the cage, the latch member being pivoted on the revolving shaft,
wherein the revolving shaft is disposed near the contact plane of the latch member,
wherein the package main body includes a latch member restricting member that restricts rotation of the latch member when the latch member restricting member is in contact with the latch member, and the package main body includes an energizing mechanism that is compressed when the latch member restricting member is moved to the position where the latch member restricting member is not in contact with the latch member, and that can push back the latch member restricting member to the position where the latch member restricting member is in contact with the latch member when the compression is released,
wherein the latch member is allowed to be rotated when the latch member restricting member is moved toward an outside of the host instrument up to a position where the latch member restricting member is not in contact with the latch member.

22. The package with a locking mechanism as defined in claim 1, further comprising:
a groove for fitting the revolving shaft, the groove being formed on an under surface of the package,
wherein the revolving shaft is integrally formed with the latch member.

23. The optical transceiver as defined in claim 12, further comprising:
a groove for fitting the revolving shaft, the groove being formed on an under surface of the package,
wherein the revolving shaft is integrally formed with the latch member.

* * * * *